T. J. BLANCH.
VARIABLE SPEED MECHANISM.
APPLICATION FILED JAN. 7, 1909.
923,321.
Patented June 1, 1909.
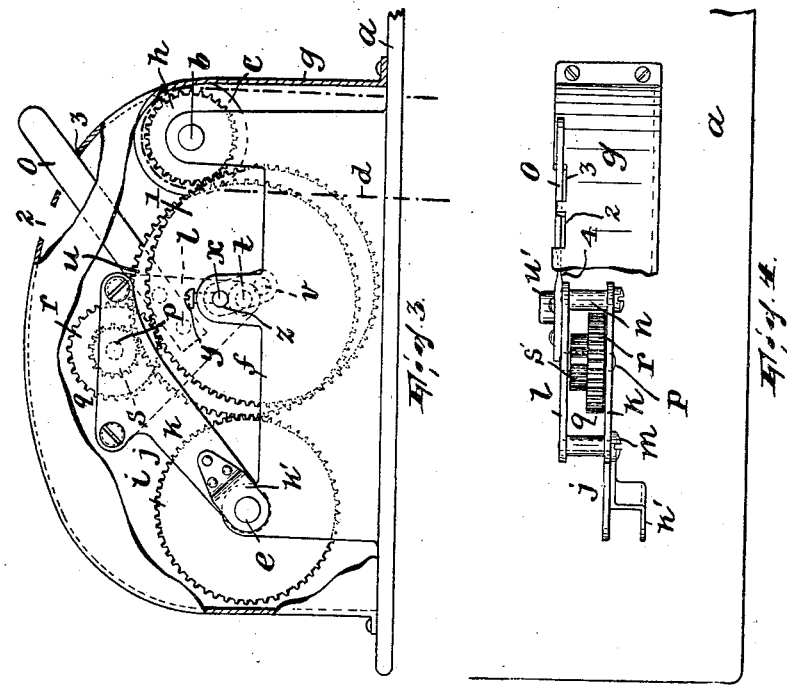
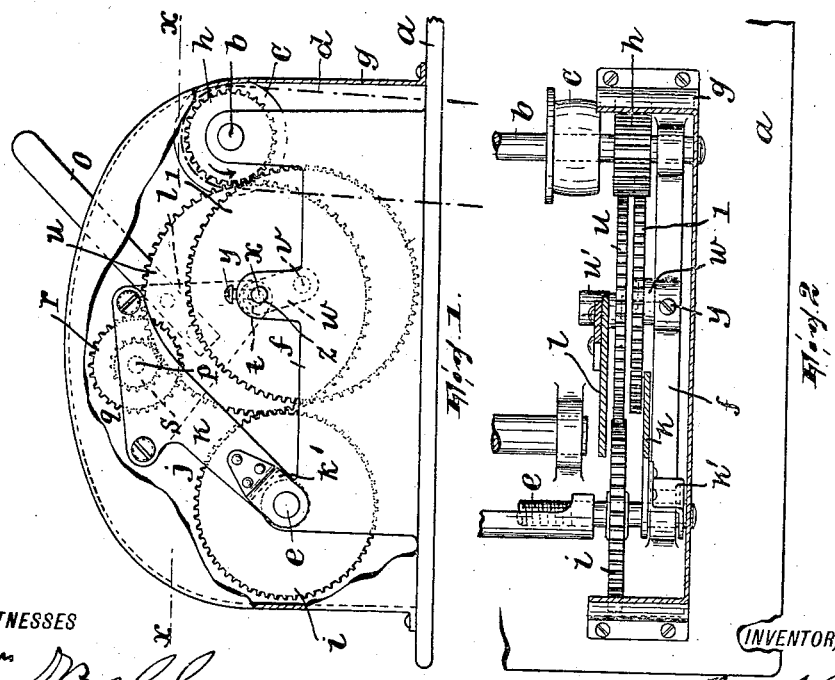
WITNESSES
INVENTOR,
BY
ATTORNEY.

UNITED STATES PATENT OFFICE.

THOMAS J. BLANCH, OF HIGHLAND FALLS, NEW YORK.

VARIABLE-SPEED MECHANISM.

No. 923,321.  Specification of Letters Patent.  Patented June 1, 1909.

Application filed January 7, 1909. Serial No. 471,148.

*To all whom it may concern:*

Be it known that I, THOMAS J. BLANCH, a citizen of the United States, residing in Highland Falls, Orange county, New York, have invented certain new and useful Improvements in Variable-Speed Mechanisms; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to variable-speed mechanisms and it has for its object to provide a mechanism of this nature whereby the speed may be quickly altered without imposing undue jar or other stress upon the mechanism and possibly damaging the same.

The invention has been devised with particular reference to variable-speed mechanisms for small machines of the nature of phonographs and the like, but it is applicable in many other adaptations, as will be obvious.

My invention will be found fully illustrated in the accompanying drawing, wherein, Figure 1 illustrates the mechanism in side elevation in connection with a phonograph machine, the casing for the mechanism appearing partly broken away; Fig. 2 is a horizontal sectional view on substantially the line $x$—$x$ of Fig. 1; Fig. 3 is a view similar to Fig. 1 except that the position of the parts is changed so that a speed different from that which is derived as the parts appear in Fig. 1 is obtained, the casing being broken away in this view to show how a certain lever-structure is held in either of two positions; and, Fig. 4 is a plan view of said lever-structure, a part of the gearing carried thereby and a fragment of the casing.

$a$ in the drawing designates the base of a phonograph or other similar machine; $b$ is the driving shaft carrying a pulley $c$ around which extends the driving belt $d$; and $e$ is the driven shaft, being in this instance a rotary screw.

$f$ is a bracket affording bearings for the shafts $b$ and $e$, and $g$ is the casing for the mechanism.

On shaft $b$ is fixed a broad toothed driving member $h$, and on shaft $e$ is fixed a toothed driven member $i$; in the present adaptation member $i$ is the larger of these two members.

$j$ designates a lever-structure fulcrumed on shaft $e$. It comprises an arm $k$ having an angle-piece $k'$ riveted thereto and forming a fork which affords the fulcrum of the lever-structure and receives a part of the bracket $f$, whereby sidewise movement of the lever-structure is prevented; a triangular plate $l$ secured to the arm in spaced relation thereto by screws $m$ penetrating the spacing sleeves $n$; and a handle $o$ riveted to the plate.

On a post $p$ connecting the arm and plate is journaled a toothed transmission member consisting of two pinions $r$ and $s$ of different sizes fixed to rotate together; and on a post $t$ fixed in a boss $u'$ on the plate is journaled another transmission member $u$, likewise toothed, in permanent mesh with the pinion $s$ and with the driven member $i$ and of such diameter as to be capable of meshing with driving member $h$ when the lever-structure is moved to its elevated position. On another post $v$ forming a part of an arm $w$ having a stud $x$ which is secured by a set-screw $y$ in a hole $z$ in bracket $f$ is journaled another transmission member $l$, also toothed, said member being in permanent mesh with the driving member $h$ and adapted to mesh with pinion $r$ when the lever structure is depressed. By providing the arm $w$ to afford a journal for member $l$ my variable-speed mechanism may be adapted to an Edison phonograph machine without altering the bracket $f$; but, in addition, the arm being adjustable by virtue of the set-screw $y$, different sizes of members $l$ may be employed.

The handle $o$ is engageable in either of two notches 2, 3 in the casing $g$, and to afford it lateral yield it may be thinned, as at 4, or otherwise constructed so as to be elastic.

Member $h$ rotates with shaft $b$ in the direction of the arrow in Figs. 1 and 2. When the lever structure is in the position shown in Fig. 1, the lever-structure being then held elevated by the handle being engaged in the notch 2, the rotary motion of member $h$ is transmitted to member $i$, directly, through transmission member $u$; upon depressing the lever-structure until its handle is received by the notch 3, transmission member $u$ is disengaged from member $h$ and the pinion $r$ of transmission member $q$ is brought into mesh with the transmission member *l*. In the first instance, the motion, as stated, is transmitted from the driving to the driven shaft by *h*, *u* and *i*, giving one speed to the driven shaft; in the second instance, it is transmitted through *h*, *l*, *r*, *s*, *u* and *i*, giving the other speed to the driven shaft.

It will be seen that the mechanism is considerably simplified and rendered capable of effecting the desired speed changes quickly and without undue jar or other stress being imposed upon the mechanism through fulcruming the lever-structure on one of the two shafts *b* and *e* and utilizing the space between the members *h* and *i* for transmission members *u* and *l*.

Having thus fully described my invention, what I claim and desire to secure by Letters Patent is:

1. The combination of a rotary driving member, a rotary driven member, a rotary transmission member geared with one of said first-named members, and a shiftable mechanism for transmitting motion to the driven member from the driving member directly or through the medium of the transmission member comprising second and third transmission members geared together and one of them being engageable with the first transmission member on shifting said mechanism in one direction and the other with the one of said first-named members with which the first transmission member is geared on shifting said mechanism in the other direction, substantially as described.

2. The combination of a rotary driving member, a rotary driven member, a rotary transmission member geared with one of said first-named members, and a shiftable mechanism for transmitting motion to the driven member from the driving member directly or through the medium of the transmission member comprising second and third transmission members geared together and one of them being engageable with the first transmission member on shifting said mechanism in one direction and the other with the one of said first-named members with which the first transmission member is geared on shifting said mechanism in the other direction, one of said second and third transmission members being geared with the other of said first-named or driving and driven members, substantially as described.

3. The combination of a rotary driving member, a rotary driven member, a rotary transmission member geared with one of said first-named members, and a shiftable mechanism for transmitting motion to the driven member from the driving member directly or through the medium of the transmission member comprising second and third transmission members geared together and one of them being engageable with the first transmission member on shifting said mechanism in one direction and the other with the one of said first-named members with which the first transmission member is geared on shifting said mechanism in the other direction, one of said second and third transmission members being geared with, and said mechanism being movable around an axis coincident with that of, the other of said first-named or driving and driven members, substantially as described.

In testimony, that I claim the foregoing, I have hereunto set my hand this 5th day of January, 1909.

THOMAS J. BLANCH.

Witnesses:
 JOHN W. STEWARD,
 WM. D. BELL.